May 2, 1944.  W. G. DION ET AL  2,347,771
LIGHT PROJECTOR
Filed March 7, 1942   2 Sheets-Sheet 2
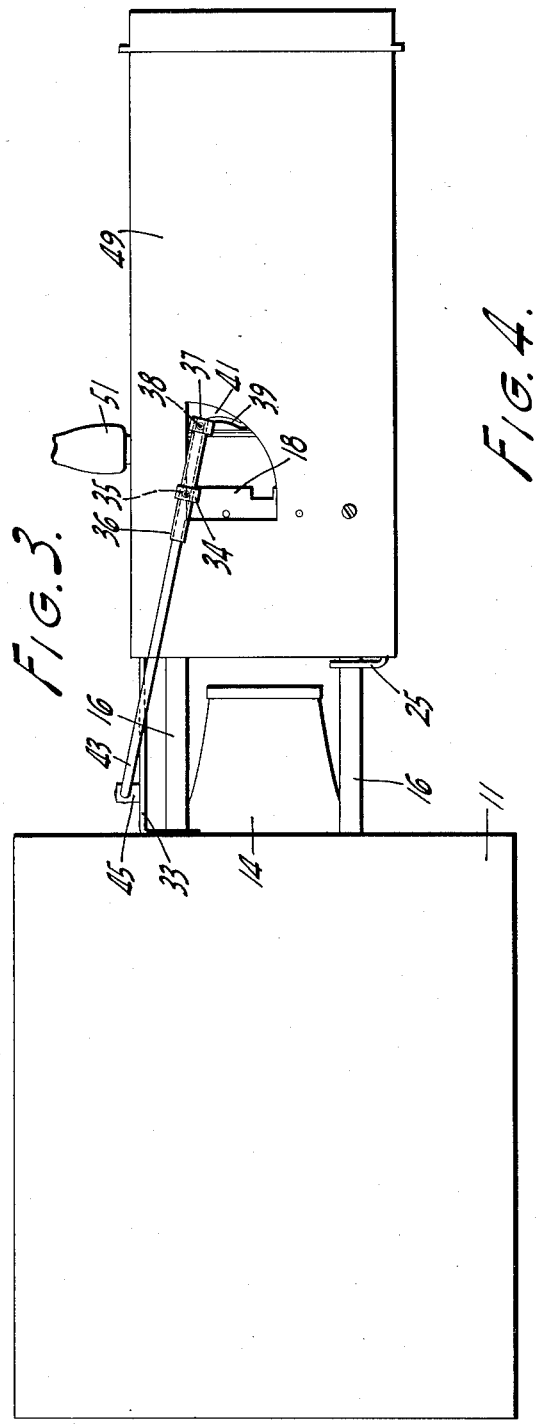
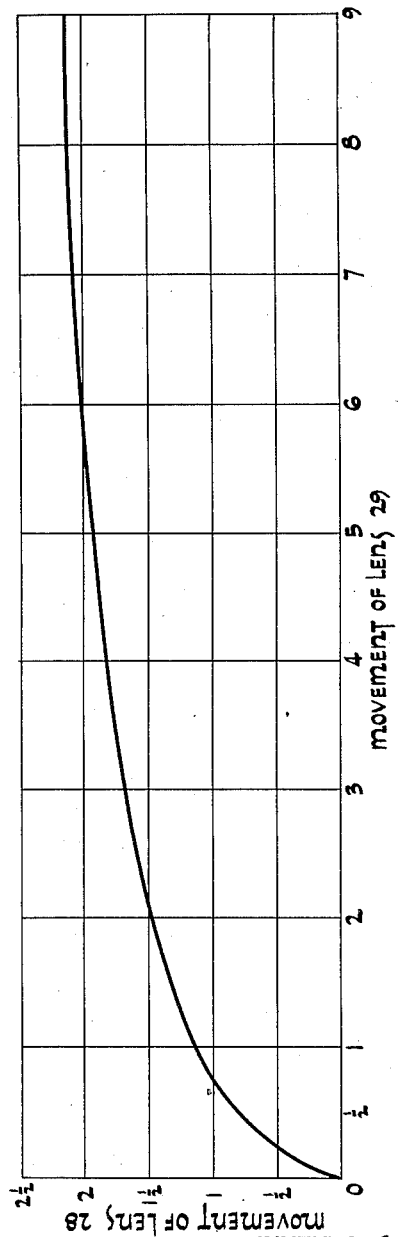
INVENTORS
WALTER G. DION AND
GERALD J. DION
BY
Bean, Brooks, Buckley & Bean
ATTORNEYS

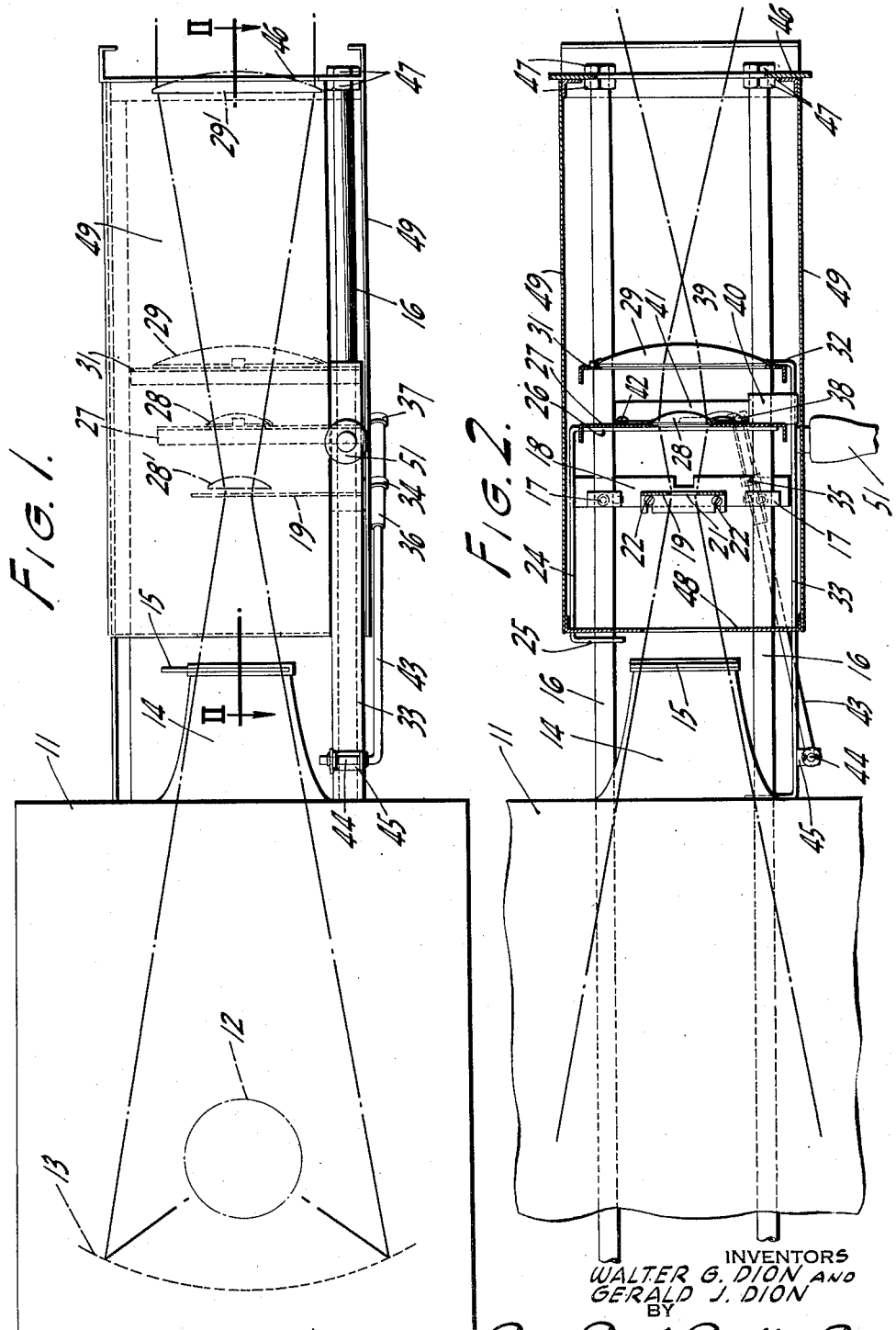

UNITED STATES PATENT OFFICE 2,347,771

LIGHT PROJECTOR

Walter G. Dion and Gerald J. Dion, Buffalo, N. Y.

Application March 7, 1942, Serial No. 433,756

9 Claims. (Cl. 240—3)

The present invention relates to illuminating apparatus and has particular reference to devices of this class wherein a source of light is projected through lens means to produce a beam of light of various diameters at a desired distance or distances from the projector, to provide different lighting effects for theatres, auditoriums and the like.

According to the invention a pair of lenses are mounted for movement relative to each other and to a source of light, and means are provided to control such relative movement so that a sharp, clear-cut spot of light of any desired size may be projected at any desired distance, within the capacity of the apparatus. The adjusting means has a single manual control handle which may be moved to vary the diameter of the light beam or spot, and such handle may also be utilized to vary the angularity of the apparatus, to maintain the spot of light upon a moving act upon a stage, for example.

The invention, by providing means for properly adjusting, automatically, the distance between the lenses as the latter are moved relatively toward or from the light source, obviates the necessity for an iris diaphragm or like means to control the diameter of the projected light beam, and by using substantially all of the light issuing from the lamp house of the apparatus, thereby permits relatively small lamps to be effectively employed.

These and other objects and advantages will become apparent from the following description of the typical embodiment of the invention shown in the accompanying drawings, wherein:

Fig. 1 is a side elevational view of the apparatus;

Fig. 2 is a section taken substantially along line II—II of Fig. 1;

Fig. 3 is a bottom plan view of the apparatus; and,

Fig. 4 is a graph illustrating the variation in the rate of movement of one lens relative to the other as the lenses move relative to the light source.

As shown in the drawings the apparatus may comprise a lamp house 11 containing a suitable source of light, such as the lamp 12, and a reflector 13 for projecting light forwardly through a hollow cone 14. On the end of the latter may be provided a douser 15 for closing the open forward end of the cone when it is desired to cut off the projected light without extinguishing the lamp 12.

The lamp and reflector may be supported upon a pair of parallel tubes 16 which may project forwardly beyond the lamp house. Mounted on these tubes and connected thereto at 17 is a bracket 18 supporting an upright plate 19, the latter being connected to the bracket by screws 22 and having an aperture 21 of a diameter corresponding to that of the light beam as projected through the cone from the housing by the lamp and reflector 13.

Slidable on the tubes 16 is a U-shaped bracket 24 having a short rear leg 25 engaging one of the tubes and a long forward leg 26 engaging both of the tubes. Leg 26 carries an upright plate 27 upon which is mounted a short focus lens 28. Disposed forwardly of lens 28 is a long focus lens 29 which is mounted upon an upright plate 31, this plate being carried by the forward leg 32 of another bracket, 33, that is arranged to slide upon the tubes 16.

A short sleeve 34 is pivoted at 35 (see Fig. 3), about a vertical axis, to bracket 18; and secured within this sleeve 34 is a tube 36 to whose forward end is connected another short sleeve, 37. The latter carries a vertical pivot pin 38 received slidably in a slot 39 formed in the horizontal flange 41 of an angle member secured to the leg 26 of bracket 24 by screws 42. As shown in Figs. 2 and 3 the curved slot 39 extends in a general direction substantially transverse of the direction of movement of the lens carrier plates 27 and 31, and with the pin 38 constitutes in effect a compensating lost motion connection between the tube 36 and the carrier of lens 28. Telecoped slidably within tube 36 is one end of a rod 43 which has at its other end an upright pintle portion 44 received in a bearing member 45 that is secured to bracket 33.

A lens housing extends around the lenses 28 and 29 and their supporting parts, the housing comprising an apertured front plate 46 secured to the tubes 16 by nuts 47, an apertured rear plate 48, and upper, lower and side walls 49 connecting the front and rear plates.

Secured to the bracket 33 and projecting laterally from the lens housing is a control handle 51. An operator may grasp the handle and slide forwardly or rearwardly along the tubes 16 the assembly comprising the bracket 33 and the long focus lens 29. Such motion will cause the rod 43 to slide within tube 36 and will also swing the tube 36 about its pivot 35, so that pivot pin 38 will describe an arc about pivot 35. In so doing pin 38 will cooperate with the slot 39 in flange 41 to move the assembly comprising the bracket 24, the plate 27 and the short focus lens 28 along the guide rods 16.

As the handle 51 and long focus lens 29 is moved forwardly, the short focus lens 28 will be moved rearwardly, but to a lesser degree, and the rate of movement of the two lenses will vary by reason of lever arm, between pintle 44 and pivot 35, becoming shorter as rod 43 slides forwardly in tube 36 while the lever arm between pivot 35 and pivot pin 38 remains of constant length, and also by reason of the curvature of slot 39.

This curvature of the slot may be varied depending upon the focal lengths of the lenses 28 and 29, and should be designed so that in all adjusted positions of the lens 29 relative to the fixed light aperture 21, the small lens 28 will be in correct focus so that the projected beam of light will project a sharply defined spot of light upon the objective.

The relative movements of typical lenses 28 and 29 is shown in the graph, Fig. 4, where rearward movement of the lens 29, from its most forward position, is plotted along a horizontal axis against forward movement of the lens 28, from its most rearward position, which is plotted along a vertical axis. From the graph it will be seen that as the long focus lens 29 is moved rearwardly from its foremost position, the short focus lens will move forwardly at a progressively faster rate. For example, as shown by the graph of typical lenses, the first half inch of rearward motion of the long focus lens 29 will result in a forward movement of the short focus lens 28 of slightly more than three-quarters of an inch, while the last few inches of rearward motion of the lens 29 results in only a very slight forward movement of lens 28.

It will be understood that throughout its range of movement the short focus lens 28 may intercept the entire beam of light projected from the lamp housing through the fixed light aperture 21 in plate 19, and project such entire beam upon the long focus lens 29. In this way substantially no light is lost as is the case where the diameter of a light beam upon a long focus lens is adjusted by means of an iris shutter or the like, yet the resulting beam cast in the form of a spot of light upon an act on a stage, for example, is sharply defined.

It will be further understood that the projector is simple of control, an operator merely moving the handle forwardly to reduce the diameter of the spot or to maintain the spot of constant diameter as an act within the spot moves away from the projector, or moving the handle rearwardly to enlarge the spot or to keep it of constant diameter as an act within the spot moves closer to the projector. In Fig. 2 the outline of the projected beam is shown with the lens 29 in substantially its rearmost position, while Fig. 1 shows the outline of the beam with the lens 29 in its most forward position, the lenses 28 and 29 being shown in broken lines in this position, as 28' and 29', respectively. A leaf spring 40 shown in Fig. 2 may be provided on the bracket 30 to exert a slight pressure upon one tube 16, to prevent accidental shifting of the lens carriers.

According to conventional practice the projector may be swivelly mounted upon a base (not shown) so that it may be swung in either a vertical plane or a horizontal plane, or both, by the operator to keep the projected light beam entrained upon a moving act upon a stage or the like, and the handle 51 may be employed by the operator for adjusting or swinging the projector for this purpose, as well as for the purpose of adjusting the lenses, thereby simplifying control of the apparatus. For certain purposes, such as for studio work, it may be desirable to remove the light aperture plate 19 from the path of the light beam, which will have the effect of diffusing the edges of the projected beam.

It will be understood further that the apparatus herein shown and described is merely illustrative of the inventive principles involved, and that these principles may be otherwise embodied without departing from the spirit of the invention or the scope of the appended claims.

What is claimed is:

1. In light projection apparatus, a support, means for projecting a beam of light including a source of light, a short focus lens for said beam, a long focus lens for the beam as projected by the short focus lens, a carrier for each of said lenses movable upon said support axially of said beam, a pair of members slidingly connected, one of said members having a pivotal connection to one of said carriers and the other of said members having a pivotal connection to the other of said carriers, one of said members having a pivotal connection to said support, and one of the pivotal connections having play in a direction substantially transverse of said beam, whereby movement of one of the carriers upon the support will effect movement in the opposite direction of the other one thereof.

2. In light projection apparatus, a support, a source of a beam of light, a short focus lens for said beam, a long focus lens for the beam as projected by the short focus lens, a carrier for each of said lenses movable upon said support axially of said beam, a tubular member pivoted adjacent one end thereof to said support and adjacent the opposite end thereof having a pin in slot connection to the carrier of the short focus lens, and a rod telescoped in said tubular member and pivoted to the carrier of the long focus lens, whereby movement of the latter will effect movement in the opposite direction of the short focus lens.

3. In light projection apparatus, a support, a source of a beam of light, a short focus lens for said beam, a long focus lens for the beam as projected by the short focus lens, a carrier for each of said lenses movable upon said support axially of said beam, a tubular member pivoted adjacent one end thereof to said support and adjacent the opposite end thereof having a pivot pin, the carrier of the short focus lens having a curved slot extending in a direction substantially transverse of the beam and receiving said pivot pin, and a rod telescoped in said tubular member and pivoted to the carrier of the long focus lens, whereby movement of the latter will effect movement of the short focus lens in the opposite direction and at a varying rate.

4. In a spot-light for uniformly illuminating areas of various diameters at given distances, a source of light and a fixed light aperture therebefore for receiving a quantity of light from said source, adjustable refracting means before said aperture for selectively spreading or converging a beam of light passing therethrough, said refracting means comprising a long focus lens disposed axially of said beam and movable manually toward and away from said source and said aperture and a short focus substantially spherical convex lens disposed axially of said beam between the long focus lens and the aperture, and means operable by and upon adjusting movement of said long focus lens for automatically moving said short focus lens to a position for directing the light beam from said aperture against said long focus lens as a beam of uniform distribution for efficient projection thereby.

5. In a spot-light for illuminating areas of various diameters at given distances, a source of light, a reflector therebehind and a fixed light aperture therebefore for receiving a maximum quantity of light from said source, and adjustable refracting means before said aperture for selectively spreading or converging a beam of light passing therethrough, said refracting means comprising a long focus lens disposed axially of said beam and movable manually toward and away from said source and said aperture and a short focus substantially spherical convex lens disposed axially of said beam between the long focus lens and the aperture, and means operable by and upon adjusting movement of said long focus lens for automatically moving said short focus lens to a position for directing the light beam from said aperture against said long focus lens as a beam of uniform distribution for projection thereby.

6. In a spot-light for illuminating areas of various diameters at given distances, a source of light and a fixed light aperture therebefore for receiving a quantity of light from said source, adjustable refracting means before said aperture for selectively spreading or converging a beam of light passing therethrough, said refracting means comprising a long focus lens disposed axially of said beam and a handle fixed thereto for manually moving the same toward and away from said source and said aperture and a short focus substantially spherical convex lens disposed axially of said beam between the long focus lens and the aperture, and means engaging between said lenses and operable upon manual adjusting movement of said long focus lens for automatically moving said short focus lens to a position for directing the light beam from said aperture against said long focus lens for efficient projection thereby.

7. In a spot-light for illuminating areas of various diameters at given distances, a source of light, a reflector therebehind and a fixed light aperture therebefore for receiving a maximum quantity of light from said source, adjustable refracting means before said aperture for selectively spreading or converging a beam of light passing therethrough, said refracting means comprising a long focus lens disposed axially of said beam and a handle fixed thereto for manually moving the same toward and away from said source and said aperture and a short focus substantially spherical convex lens disposed axially of said beam between the long focus lens and the aperture, and means engaging between said lenses and operable by and upon adjusting movement of said long focus lens for automatically moving said short focus lens to a position for directing the light beam from said aperture against said long focus lens for efficient projection thereby.

8. In light projection apparatus, means for projecting a beam of light comprising a source of light and a light aperture, a long focus lens disposed axially of said beam, handle means for controlling the direction of light projection of said apparatus, said handle means being secured directly to said long focus lens for adjusting the distance between the lens and the light source by manual longitudinal movement of said handle means, a short focus lens disposed between said long focus lens and said aperture, and mechanical means engaging between said lenses whereby adjusting movement of the long focus lens is accompanied automatically by proportionate adjusting movement of the latter to provide a uniformly illuminated area of variable size at a given distance.

9. In light projection apparatus, a support, means for projecting a beam of light including a light source, a pair of cooperating focusing lenses for said beam, a carrier for each of said lenses movable upon said support axially of said beam, a pair of members slidingly connected, one of said members having a pivotal connection to one of said carriers and the other of said members having a pivotal connection to the other of said carriers, one of said members having a pivotal connection to said support, and one of the pivotal connections having play in a direction substantially transverse of said beam, whereby movement of one of the carriers upon the support will effect movement in the opposite direction of the other one thereof.

WALTER G. DION.
GERALD J. DION.